E. J. REDDING.
LOCKING DEVICE FOR MOTOR VEHICLES.
APPLICATION FILED JULY 28, 1920.
1,415,394.
Patented May 9, 1922.
2 SHEETS—SHEET 1.
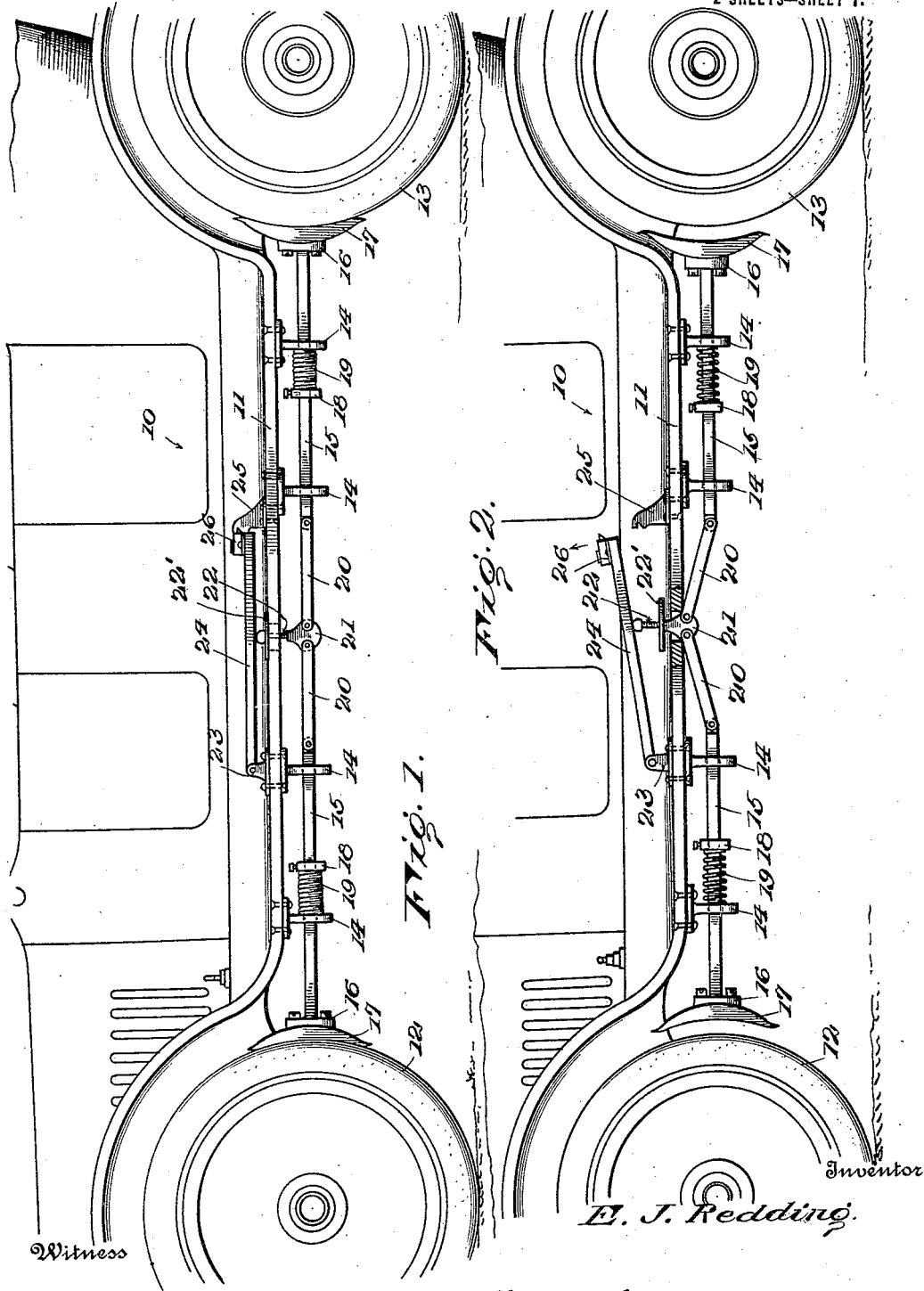

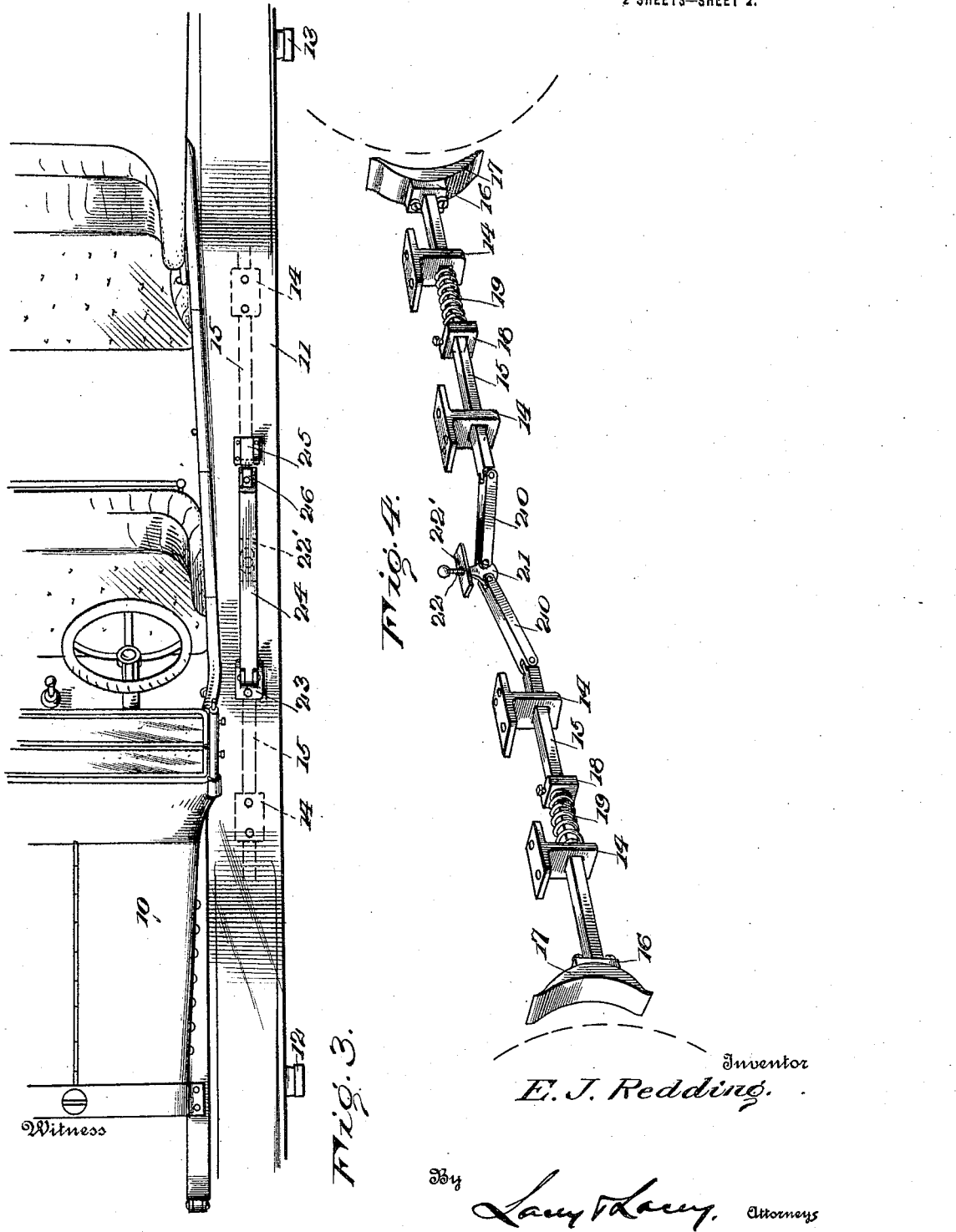

UNITED STATES PATENT OFFICE.

ELSIE J. REDDING, OF MOUNT HOLLY, NEW JERSEY.

LOCKING DEVICE FOR MOTOR VEHICLES.

1,415,394.  Specification of Letters Patent.  Patented May 9, 1922.

Application filed July 28, 1920. Serial No. 399,473.

*To all whom it may concern:*

Be it known that I, ELSIE J. REDDING, citizen of the United States, residing at Mount Holly, in the county of Burlington and State of New Jersey, have invented certain new and useful Improvements in Locking Devices for Motor Vehicles, of which the following is a specification.

This invention relates to an improved locking device for motor vehicles and has as one of its principal objects to provide a device of this character which may be readily employed in connection with substantially any conventional design of motor vehicle and which will be adapted to effectually prevent unauthorized use of the vehicle.

The invention has as a further object to provide a device of this character which may be attached to one running board of a vehicle and which may be operated to lock the wheels at the adjacent side of the vehicle against turning movement.

A still further object of the invention is to provide a device of this character which will also serve to lock the front wheels of the vehicle against being guided.

And the invention has as a still further object to provide a device which will be characterized by entire structural simplicity and which may be readily applied.

Other and incidental objects will appear hereinafter.

In the drawings:

Figure 1 is a side elevation showing my improved device upon a motor vehicle of conventional design, this view illustrating the device operated to lock the vehicle, Figure 2 is a view similar to Figure 1, showing the normal position of the device when operated to release the vehicle, Figure 3 is a fragmentary top plan view, and Figure 4 is a perspective view showing the device in detail.

In order that the construction, mounting and operation of my improved device may be accurately understood I have, in the drawings, shown the device in connection with a motor vehicle 10 of conventional design. One running board of the vehicle is indicated at 11 while the front and rear wheels of the vehicle at the adjacent side thereof are indicated at 12 and 13 respectively. In carrying the invention into effect, I employ pairs of supporting guides secured in any approved manner beneath the running board 11 and slidable through these pairs of guides are rods 15, the rods being preferably squared to coact with the guides so that the rods will thus be held against rotation. At their outer ends the rods are formed with heads 16 and screwed or otherwise secured to these heads are locking shoes 17 confronting the wheels 12 and 13 and having curved outer faces to fit the peripheral surface of the tires of said wheels. Adjustable upon the rods are collars 18 and bearing between said collars and one of the supporting guides of each pair are helical springs 19 surrounding the rods and acting to normally hold the locking shoes retracted away from the vehicle wheels. To the inner confronting ends of the rods are pivotally connected toggle links 20 and pivotally uniting these links is a coupling head 21 into which is threaded an upstanding headed shank or stem 22, freely received through a suitable opening in the running board 11 and having a stop plate 22' thereon to coact with the running board for limiting the coupling head in its downward movement. Mounted upon the running board at one side of said opening is a bearing plate 23 upon which is pivoted at one end a locking lever or latch 24. At the opposite side of the opening in the running board is a catch plate 25 arranged in alinement with the opening and the plate 23 and mounted upon the free end of the latch to cooperate with said plate is a lock 26. This lock may be of any approved design.

As will now be readily understood, when the latch 24 is released, the springs 19 will hold the locking shoes 17 away from the wheels 12 and 13 of the vehicle so that the coupling head 21 will be elevated to the position shown in Figure 2 having its stem 22 projecting through the opening in the running board, the coupling head being adapted to coact with the running board for limiting the movement of the rods 15 under the influence of said springs. Consequently, under such conditions, the vehicle may be freely operated. However, by turning the front wheels of the vehicle until the wheel 12 alines with the wheel 13, the latch 24 may simply be depressed, as by stepping upon said latch, to engage the lock 26 of the latch with the latch plate 25. When the latch is so depressed, the latch will, of course, coact with the stem 22 of the coupling head 21 for depressing said head when the toggle links 20 will act to project the rods 15 and accordingly move the locking shoes 17 into engagement with the wheels to be held in such position by the latch. Accordingly the vehicle wheels 12 and 13 will then be rigidly held against turning movement so that the vehicle will be effectually locked against unauthorized use. Further, the front wheels of the vehicle will also, as will be seen, be locked against guiding movement since it will be impossible to swing the wheel 12. I accordingly provide a particularly effective device for the purpose set forth and a device which may be readily employed in connection with substantially any conventional design of motor vehicle.

Having thus described the invention, what is claimed as new is:

1. The combination with a motor vehicle having the front wheels thereof mounted to oscillate, of tire engaging means at the side of the vehicle, and means to coact with the tire engaging means for shifting the tire engaging means to coact with the tires of the front and rear wheels at said side of the vehicle for locking such wheels against rotation as well as also locking the front wheels against oscillation.

2. The combination with a motor vehicle having the front wheels thereof mounted to oscillate, of rods slidably mounted at opposite sides of the vehicle, shoes carried by said rods, means for sliding the rods and shifting the shoes to engage the vehicle wheels for locking said wheels against rotation as well as also locking the front wheels against oscillation, a latch arranged to operatively coact with the rods for slidably shifting said rods, and means for locking the latch active.

In testimony whereof I affix my signature.

ELSIE J. REDDING. [L. S.]